United States Patent
Ezrielev et al.

(10) Patent No.: US 11,816,341 B2
(45) Date of Patent: Nov. 14, 2023

(54) ORCHESTRATING DISTRIBUTION OF FUNCTION AS A SERVICE (FAAS) WORKLOADS TO AUTONOMOUS STORAGE SYSTEMS

(71) Applicant: Dell Products, L.P., Hopkinton, MA (US)

(72) Inventors: Ofir Ezrielev, Be'er Sheva (IL); Nadav Azaria, Meitar (IL); Avitan Gefen, Tel Aviv (IL)

(73) Assignee: Dell Products, L.P., Hopkinton, MA (US)

( * ) Notice: Subject to any disclaimer, the term of this patent is extended or adjusted under 35 U.S.C. 154(b) by 68 days.

(21) Appl. No.: 17/577,651

(22) Filed: Jan. 18, 2022

(65) Prior Publication Data

US 2023/0229322 A1     Jul. 20, 2023

(51) Int. Cl.
 *G06F 3/06* (2006.01)
(52) U.S. Cl.
 CPC ........... *G06F 3/0631* (2013.01); *G06F 3/067* (2013.01); *G06F 3/0613* (2013.01); *G06F 3/0653* (2013.01)
(58) Field of Classification Search
 CPC .... G06F 3/0631; G06F 3/0613; G06F 3/0653; G06F 3/067
 See application file for complete search history.

(56) References Cited

U.S. PATENT DOCUMENTS

| | | | | |
|---|---|---|---|---|
| 11,729,440 | B2 * | 8/2023 | Butler | H04N 21/234 709/224 |
| 2021/0263779 | A1 * | 8/2021 | Haghighat | G06F 9/5061 |
| 2021/0326221 | A1 * | 10/2021 | Guim Bernat | G06F 11/0709 |

OTHER PUBLICATIONS

HoseinyFarahabady, MohammadReza, et al. "A qos-aware resource allocation controller for function as a service (faas) platform." Service-Oriented Computing: 15th International Conference, ICSOC 2017, Malaga, Spain, Nov. 13-16, 2017, Proceedings. Springer International Publishing, 2017. (Year: 2017).*
Ascigil, Onur, et al. "Resource provisioning and allocation in function-as-a-service edge-clouds." IEEE Transactions on Services Computing 15.4 (Jan. 2021): 2410-2424. (Year: 2021).*

* cited by examiner

Primary Examiner — Nicholas J Simonetti
(74) Attorney, Agent, or Firm — Anderson Gorecki LLP (57) ABSTRACT

A Function as a Service (FaaS) distribution system is configured to implement FaaS as a Service (FaaSaaS), enabling autonomous storage systems to be used as FaaS providers during periods where the storage systems are not being used at full capacity to process primary workloads. The FaaS distribution system receives functions from FaaS consumers, and selects a FaaS provider from a set of autonomous storage systems currently able to process FaaS workloads. The FaaS distribution system selects FaaS providers based on an expected execution time of the function and expected execution times of other functions executing on particular FaaS providers, to preferentially select a FaaS provider that is currently running an instance of the function, and to preferentially select a FaaS provider that has other functions that are current executing that are not expected to finish execution at the same time the current function is expected to complete execution.

20 Claims, 7 Drawing Sheets

Function Allocation Table 300

| Function Type 400 | Function Provider 405 | Dispatch Time 410 | Expected Duration 415 | Actual End Time 420 |
|---|---|---|---|---|
| 1050052 | 3456 | 1:25PM | 10 Minutes | 1:36PM |
| 1050051 | 2225 | 1:25PM | 5 Minutes | 1:31PM |
| 1050052 | 3456 | 1:30PM | 10 Minutes | 1:39PM |
| ... | ... | ... | ... | ... |
| 1050053 | 2225 | 1:30PM | 15 Minutes | - |

ORCHESTRATING DISTRIBUTION OF FUNCTION AS A SERVICE (FAAS) WORKLOADS TO AUTONOMOUS STORAGE SYSTEMS

FIELD

This disclosure relates to computing systems and related devices and methods, and, more particularly, to a method and apparatus for orchestrating distribution of Function as a Service (FaaS) workloads to autonomous storage systems.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A Function as a Service (FaaS) distribution system is provided that is configured to implement FaaS as a Service (FaaSaaS), enabling autonomous storage systems to be used as FaaS providers during periods where the storage systems are not being used at full capacity to process primary workloads. The FaaS distribution system receives functions from FaaS consumers, determines capabilities of the storage systems participating in a FaaS environment, and selects a FaaS provider from a set of autonomous storage systems currently able to process FaaS workloads. The FaaS distribution system, in some embodiments, selects FaaS providers based on an expected execution time of the function and expected execution times of other functions executing on particular FaaS providers, to preferentially select a FaaS provider that is currently running an instance of the function, and to preferentially select a FaaS provider that has other functions that are current executing that are not expected to finish execution at the same time the current function is expected to finish execution. By having multiple functions executing on a given FaaS provider that have different execution end times, it is possible to free up processing resources of the FaaS provider more quickly than in instances where multiple functions are all likely to finish execution at the same time. This enables the processing resources of the FaaS provider to be accessed more quickly in the event that the primary workload resumes, which requires the processing resources of the storage system to be used to process the primary workload, rather than the FaaS workload.

DETAILED DESCRIPTION

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Function as a Service (FaaS) is a type of cloud computing service that allows developers to build, compute, run, and manage application packages as functions without having to maintain their own infrastructure. FaaS is an event-driven execution model that runs in stateless containers, and those functions manage server-side logic and state using services from a FaaS provider. A FaaS consumer provides a function that the FaaS consumer would like to deploy. The term "function" as used herein, is an application that needs to be executed in a computer environment. A FaaS consumer provides the function to a FaaS provider. The FaaS provider executes the function, and responds with the result of the function. After the FaaS provider has completed executing the function, the container is removed from the FaaS provider, and the processing resources used to implement the function are restored on the FaaS provider, thus enabling the processing resources to be used for other purposes.

Data centers include storage systems that are used to provide storage resources for applications, for example to provide back-end storage resources for applications such as databases, online transaction processing, and other applications, that form the primary workload of the storage system. To ensure that the storage systems process the primary workload sufficiently quickly, one or more SLA (Service Level Agreement) parameters may be specified. Example SLA parameters that a particular autonomous storage system might be required to meet can include the number of IO operations per second (IOPS), the response time, and similar metrics.

Data centers often experience periods where the primary workload presents higher demand on the processing resources of the storage system, and periods where the primary workload presents less workload on the processing resources. The number of storage systems that are acquired (purchased or leased) to implement the data center, and the configuration of the storage systems acquired to implement the data centers, are often based on the expected workloads during periods of higher demand. This means that the autonomous storage systems used to implement the data center might have excess processing, storage, and other resources that are not used during periods of lower demand. However, allocating additional processing and storage tasks to be implemented using the excess processing and storage capacity of the storage system can lead to conflicts, for example if the primary workload suddenly resumes. Having additional tasks executing on the storage systems of the data centers can cause the storage systems to violate one or more of the SLA requirements, which is an impediment to fully utilizing the processing resources of the storage systems during periods of lower demand.

A Function as a Service (FaaS) distribution system is provided that is configured to implement FaaS as a Service (FaaSaaS), enabling autonomous storage systems to be used as FaaS providers during periods where the storage systems are not being used at full capacity to process primary workloads. The FaaS distribution system receives functions from FaaS consumers, determines capabilities of the storage systems participating in a FaaS environment, and selects a FaaS provider from a set of autonomous storage systems currently able to process FaaS workloads. The FaaS distribution system, in some embodiments, selects FaaS providers based on an expected execution time of the function and expected execution times of other functions executing on particular FaaS providers, to preferentially select a FaaS provider that is currently running an instance of the function, and to preferentially select a FaaS provider that has other functions that are current executing that are not expected to finish execution at the same time the current function is expected to finish execution. By having multiple functions executing on a given FaaS provider that have different execution end times, it is possible to free up processing resources of the FaaS provider more quickly than in instances where multiple functions are all likely to finish execution at the same time. This enables the processing resources of the FaaS provider to be accessed more quickly in the event that the primary workload resumes, which requires the processing resources of the storage system to be used to process the primary workload, rather than the FaaS workload.

Since the FaaS providers are implemented using autonomous storage systems, which are commonly used to provide access to data, it is possible for the storage systems to process FaaS functions that require access to data. In some embodiments, if the FasS function implements an IO, the IO is intercepted by the FaaS platform and forwarded to the FaaS distribution system, which relays the IO to the FaaS consumer where the requested data resides. The FaaS consumer responds to the IO, which is then relayed to the FaaS function to enable the FaaS function to execute remotely from the data required by the FaaS function. By intercepting a functions IO to enable the function to run remotely, it is possible to enable IO operations such as database accesses to be implemented using functions, which would not otherwise be possible.

Figure 1:
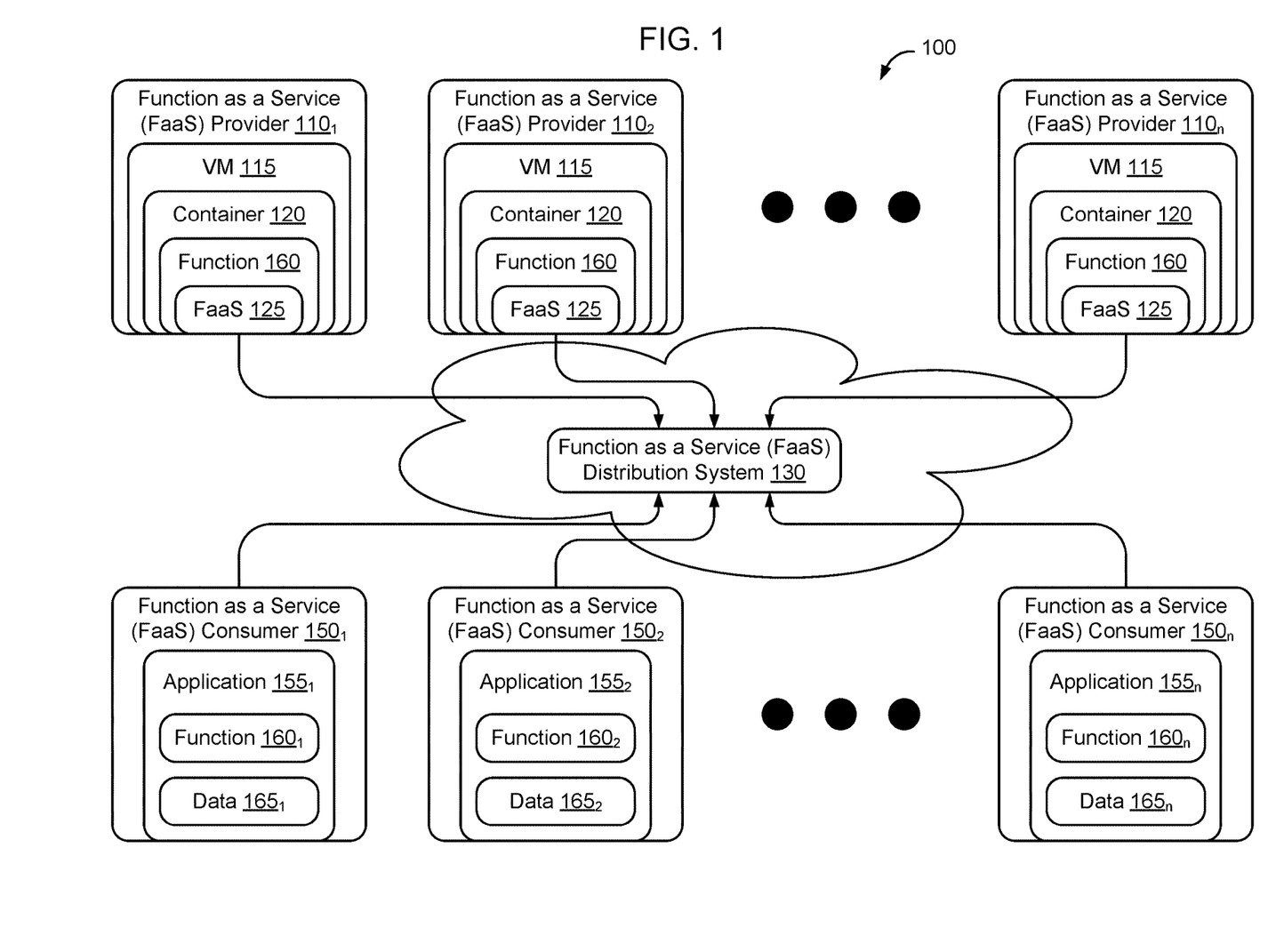
FIG. 1 is a functional block diagram of an example FaaS environment, including a Function as a Service (FaaS) distribution system configured to orchestrate distribution of Function as a Service (FaaS) workloads between autonomous storage systems, according to some embodiments.
Figure 2:
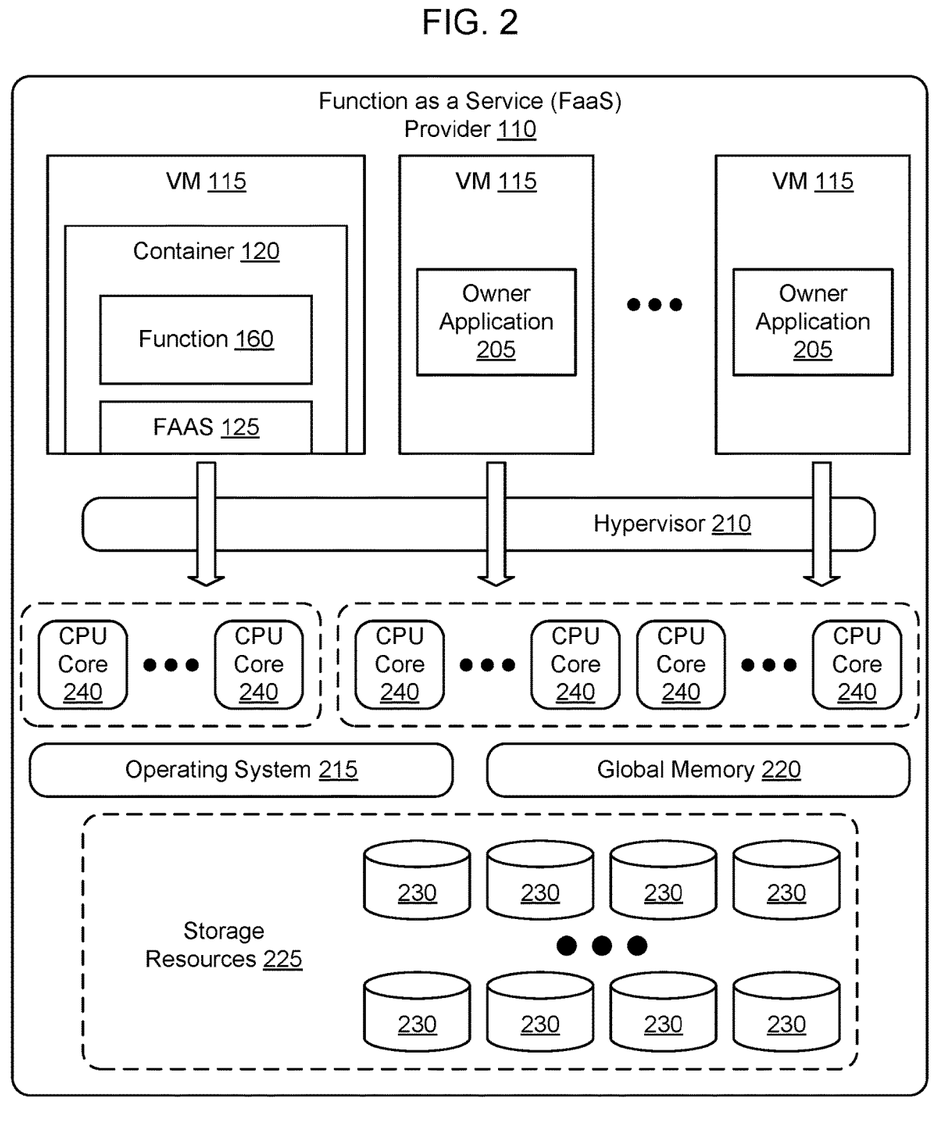
FIG. 2 is a functional block diagram of an example autonomous storage system configured to be used to process FaaS workload on demand, according to some embodiments.

FIG. 1 is a functional block diagram of an example FaaS environment 100, including a Function as a Service (FaaS) distribution system 130 configured to orchestrate distribution of Function as a Service (FaaS) workloads 160 between a set of dynamically changing set of autonomous storage systems configured to implement FaaS providers 110 by processing FaaS workloads, according to some embodiments. As shown in FIG. 1, in some embodiments the FaaS providers 110 (labeled $110_1$, $110_2$, $110_n$ in FIG. 1) are autonomous storage systems used to implement one or more data centers. An example asset in the form of a storage system is shown in FIG. 2, and is described in greater detail below. In FIG. 1, each autonomous storage system implementing a FaaS provider 110 has a primary storage system workload that the autonomous storage system must process while meeting Service Level Agreement (SLA) metrics.

During periods of lower activity the processing resources of the storage systems are used to process Function as a Service (FaaS) workloads. For example, in some embodiments a FaaS consumer 150 is executing an application 155 which includes one or more functions 160 and data 165. Optionally, the functions 160 may require access to the data 165 during execution. The FaaS consumer 150 transmits the function 160 to a FaaS distribution system 130, which selects one of the FaaS providers 110 to implement the function 160. The function 160 is then provided to the selected FaaS provider 110, for example using a FaaS platform 125 such as OpenFaaS. If the FaaS provider 110 is not currently executing an instance of the function, a container 120 including the function is loaded to a virtual machine 115 on the selected storage system. The function is then executed within the container and, once execution is finished, the container is removed from the virtual machine unless the container is required for implementation of another instance of the function 160.

FIG. 2 is a functional block diagram of an example autonomous storage system configured to be used to process FaaS workload on demand, according to some embodiments. As shown in FIG. 2, in some embodiments the autonomous storage system 110 has a set of physical processing resources such as a set of CPU cores 240, global memory 220, and storage resources 225 implemented as one or more arrays of physical storage devices 230. Storage system 110 has an operating system 215, and a hypervisor 210 that abstracts the physical processing resources from virtual machines 115 instantiated on the autonomous storage system 110. In some embodiments, some of the virtual machines 115 are configured to process the primary workload 205 on the autonomous storage system 110.

In some embodiments, to enable the autonomous storage system to be used as a FaaS provider 110, one or more virtual machines 115 are instantiated on the autonomous storage system 110, and a FaaS platform 125, such as OpenFaaS, is configured in the virtual machine. During periods of lower workload, one or more containerized functions may be loaded to the FaaS virtual machine using the FaaS platform 125, to enable the processing resources of the autonomous storage system 110 to be used to process FaaS workloads. The FaaS distribution system 130 functions as a service, to provide FaaS workloads to FaaS providers 110 on demand, thus enabling greater use of the processing resources of the autonomous storage system 110, while simultaneously allowing those processing resources to be quickly reclaimed in the event that the processing resources are required to be used to process primary workloads.

Figure 3:
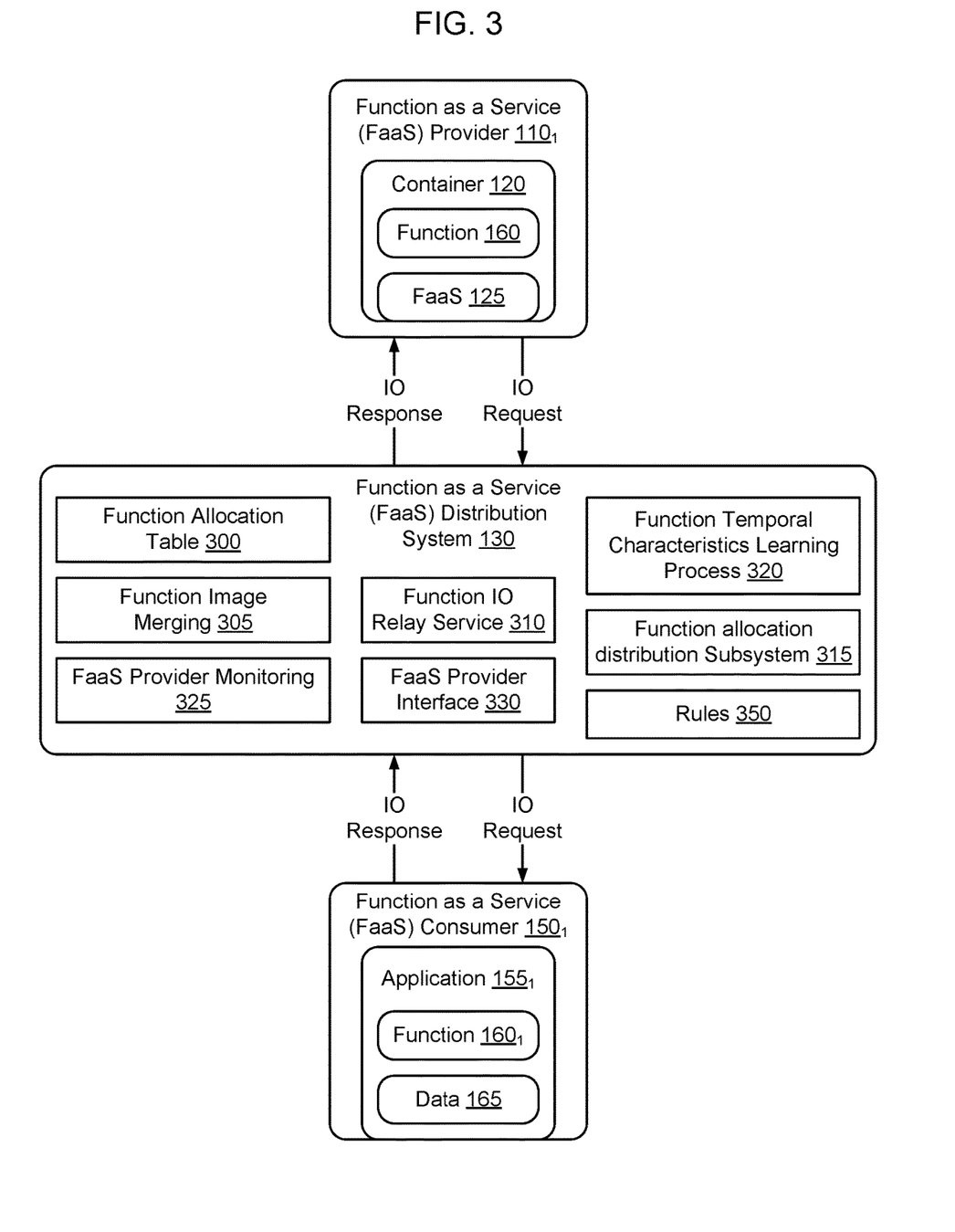
FIG. 3 is a functional block diagram of a FaaS distribution system interposed between a set of FaaS consumers and a dynamically changing set of available FaaS providers, according to some embodiments.

FIG. 3 is a functional block diagram of a FaaS distribution system 130 interposed between a set of FaaS consumers 150 and a dynamically changing set of available FaaS providers 110, according to some embodiments. As shown in FIG. 3, in some embodiments the FaaS distribution system 130 implements a Function IO relay service 310. Functions 160 that execute in a FaaS environment conventionally are implemented in a container that has all the code, libraries, and data required by the function to enable the function to execute in a stateless manner and, once completed, to be removed from the virtual machine. In some embodiments, when a function issues an IO, the IO is received by the operating system of the virtual machine and passed from the virtual machine to the FaaS distribution system 130 as an IO request. The Function IO relay service 310 forwards the IO to the FaaS consumer 150 which has access to the requested data 165. The FaaS consumer 150 retrieves the data requested by the IO, and sends an IO response to the FaaS distribution system 130. The function IO relay service 310 forwards the IO response to the FaaS provider 110 where it is passed to the function in the container. In this manner, the function is able to continue to access the data on the FaaS consumer 150 while remotely executing in a FaaS provider 110.

In some embodiments, when the FaaS distribution system 130 receives a function to be implemented on a FaaS provider 110, the FaaS distribution system 130 selects a FaaS provider 110 from a set of autonomous storage systems. In some embodiments, as shown in FIG. 3, the FaaS distribution system 130 has a function allocation distribution subsystem 315 configured to implement a set of function allocation distribution rules 350 that the FaaS distribution system 130 uses to prioritize between available FaaS providers 110. As functions are allocated to FaaS providers 110, the FaaS distribution system 130 stores records in a function allocation data structure 300. In some embodiments the entries in the function allocation data structure identify which functions have been allocated to which FaaS provider 110, when the function was allocated to the FaaS provider 110, and when the function is expected to finish executing on the FaaS provider 110 in a function allocation table 300. To enable the FaaS distribution system 130 to implement some of the function allocation distribution rules, in some embodiments the FaaS distribution system 130 has a function temporal characteristics learning process 320. Example temporal characteristics that may be learned by the learning process include a regression between function type and execution duration, a regression between function type and function instance request frequency, and other ways to characterize expected time-based characteristics of the functions. In some embodiments, the FaaS distribution system 130 includes a function image merging subsystem 305 to enable preferential selection of FaaS providers 110 based on whether an image of a given function to be allocated is able to be merged with an image of another previously allocated function that is currently executing on one of the FaaS providers.

In some embodiments, one of the function allocation distribution rules 350 implemented by the function allocation distribution subsystem 315 is that the FaaS distribution system 130 will preferentially select one of the FaaS providers 110 from a dynamically changing set of FaaS providers 110 to preferentially select a FaaS provider 110 that is already executing an instance of the function. Loading an image of a function can take a finite amount of time. If one of the available FaaS providers 110 is already executing an instance of the function, it may be possible to more quickly initiate execution and completion of the function by allocating the new instance of the function to a FaaS provider 110 that is already executing an instance of the function.

In some embodiments, to determine if one of the FaaS providers 110 is already executing an instance of the function, the function allocation distribution subsystem 315 determines a likely amount of time that it will take to implement the function (likely duration) from the function temporal characteristics learning process 320, and then performs a search on the function allocation table 300 to identify any FaaS providers 110 that were allocated an instance of the function within the expected execution duration of the function. For example, if the function allocation distribution subsystem 315 learns from the function temporal characteristics learning process 320 that a new function to be allocated has an execution duration of 10 minutes, the function allocation distribution subsystem 315 will perform a search on the function allocation table 300 to identify any other instances of the function that have been allocated to FaaS providers 110 within the preceding 10 minutes. If a given FaaS provider 110 is located that meets this criteria, in some embodiments the given FaaS provider 110 is selected and the function is distributed to the given selected FaaS provider 110.

In some embodiments, one of the function allocation distribution rules 350 implemented by the function allocation distribution subsystem 315 is that the FaaS distribution system 130 will preferentially select one of the FaaS providers 110 from a dynamically changing set of FaaS providers 110 to preferentially select a FaaS provider 110 that does not have other executing functions that are anticipated to complete execution at the same time as the current function. Specifically, by selecting FaaS providers 110 such that the function execution end times are spread out over time, it is possible for any given FaaS provider 110 to reclaim processing resources more quickly in the event that there is an increase in the primary workload.

For example, if a given function has an expected duration of 10 minutes, and the function is allocated to a FaaS provider 110 that has already been assigned two other functions which currently also are expected to continue to execute for approximately 10 minutes, assigning the given function to that FaaS provider 110 will require the FaaS provider 110 to commit processing resources to three functions for 10 minutes before the FaaS provider 110 is able to reclaim any of the processing resources. By contrast, if the given function is assigned to a FaaS provider 110 that has two other functions which are expected to continue to execute for approximately 3 minutes and 6 minutes, respectively, if the primary workload on the FaaS provider 110 increases, the FaaS provider 110 will only need to wait 3 minutes before starting to reclaim some of the processing resources. Accordingly, by allocating FaaS workload based on expected completion and causing the function execution end times to be distributed over time on any given autonomous storage system, it is possible to make the processing resources of the autonomous storage system more readily available to be used for processing primary workloads.

Figure 4:
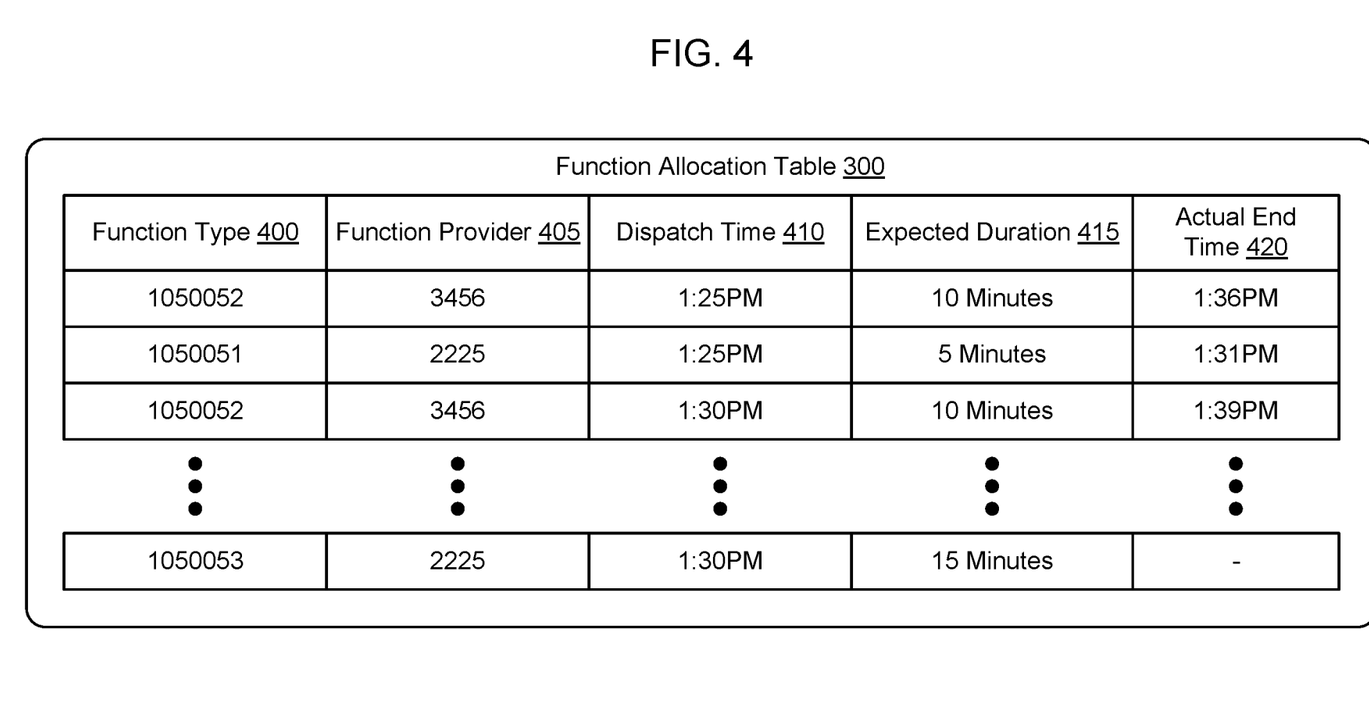
FIG. 4 is a functional block diagram of an example data structure configured to implement a function allocation table, according to some embodiments.

FIG. 4 is a functional block diagram of an example data structure configured to implement a function allocation table 300, according to some embodiments. As shown in FIG. 4, in some embodiments the function allocation table 300 includes a plurality of entries based on functions that have been allocated by the function allocation distribution subsystem 315. For example, each time a function is allocated by the function allocation distribution subsystem 315, a new entry may be created in the function allocation table 300. Although FIG. 4 shows the example function allocation table 300 implemented using a data structure in the form of a table, it should be understood that other types of data structures can be used to implement the function allocation table 300. Example other types of data structures might include databases, ledgers, distributed ledgers, block chain, linked lists, or any other searchable data structures. Likewise, multiple data structures could be used, depending on the implementation.

In some embodiments, the entries of the function allocation table 300 include the function type 400, the function provider 405, the function dispatch time 410, and the expected duration 415. The combination of these fields enables the function allocation distribution subsystem 315 to search the function allocation table 400 for other instances of the same function that might be currently executing on one of the FaaS providers 110.

In some embodiments, the expected duration 415 is based on the function type, and a learned recursion between function type and function duration that has been learned by the function temporal characteristics learning process 320. The expected duration 415 may be a static value once the function has been allocated, or may be updated while the function is being executed, for example using temporal difference learning. Temporal difference learning is a reinforcement learning process that enables a prediction to be adjusted to match later, more accurate, predictions about the future before the final outcome is known. So, in the context of FIG. 4, as the learned recursion between function type and duration of the function temporal characteristics learning process 320 changes over time, these changes may be used, in some embodiments, to adjust previous expected duration values 415 of executing functions prior to completion of execution of those functions.

In some embodiments, the entries of the function allocation table also include an actual end time 420. When functions stop executing, in some embodiments, the FaaS platform notifies the FaaS distribution system 130 that the function has completed execution. The FaaS distribution system 130 updates the actual end time 420 of the corresponding entry.

In some embodiments, the function allocation table 300 maintains a ledger of functions that were allocated to FaaS providers 110 over time, to enable the FaaS distribution system 130 to allocate credit between FaaS providers. In some embodiments, maintaining the function allocation table 300 by the FaaS distribution system 130 enables the quantity of processing resources expended by each of the FaaS providers 110 for use in connection with processing FaaS workloads. In some embodiments, inclusion of the function type, FaaS provider 110, function start time, and function actual end time 420 enables entries in the data structure to accurately reflect the amount of processing resources any given FaaS provider 110 used in connection with processing FaaS workload in the FaaS ecosystem 100 over time.

Figure 5:
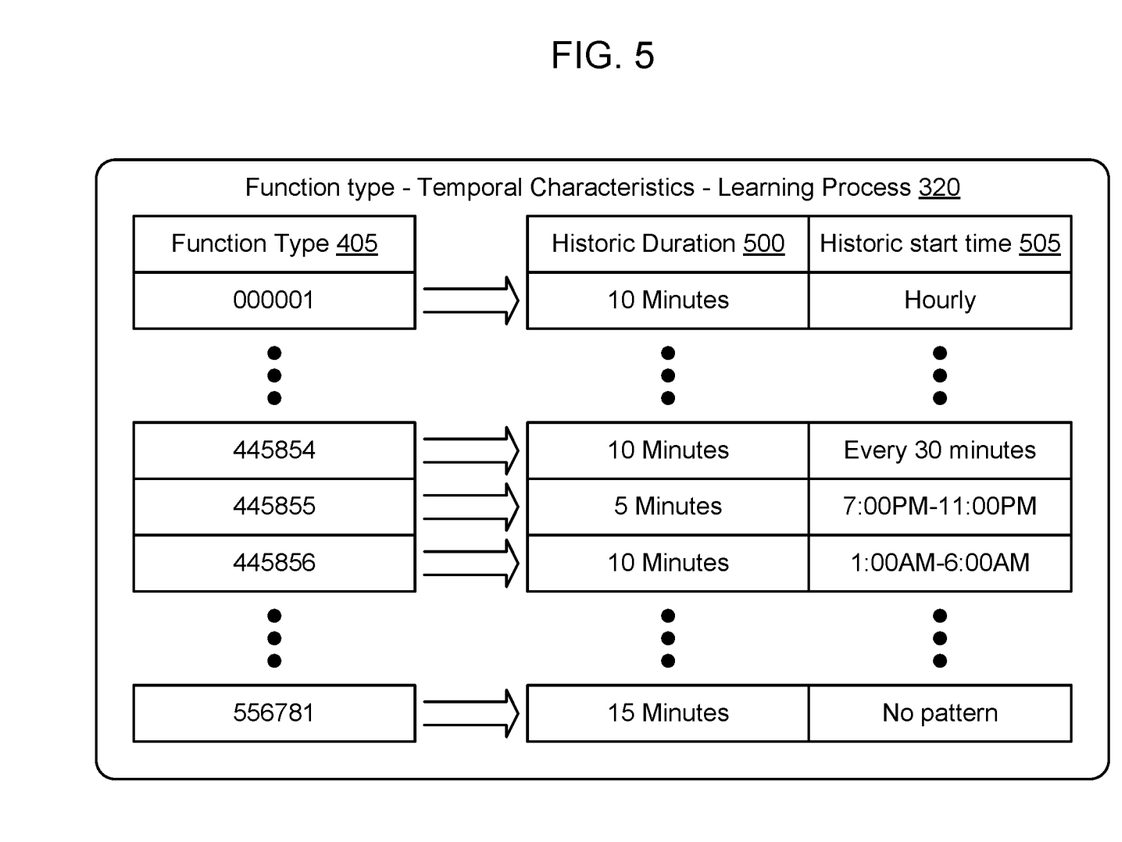
FIG. 5 is a functional block diagram of a learning process configured to learn a regression between function type and function temporal characteristics, according to some embodiments.

FIG. 5 is a functional block diagram of a learning process configured to learn a regression between function type and function temporal characteristics, according to some embodiments. As shown in FIG. 5, in some embodiments a learning process is used to learn a recursion between function type 400 and execution duration 410. For example, in some embodiments as functions are allocated by the FaaS distribution system 130, entries are created for the functions. These entries include the function type 400, the function dispatch time 410 and function actual end time 420. The function temporal characteristics learning process uses each instance of allocation of a function as a training example to train the learning process to learn a recursion between function type and expected function duration.

In some embodiments, the learning process also uses the entries of the function allocation table as training examples to train the learning process to learn a recursion between function type and historic function start time. Some functions may have strong historic correlation, while other functions may not have strong historic correlation. By learning the historic function start time of the various types of functions, it is possible to use these temporal characteristics to preferentially allocate different workload types to the same FaaS provider with minimal Pearson Cross-Correlation. Although some embodiments will be described in which minimal Pearson Cross-Correlation is used as an example correlation metric between function execution temporal characteristics, it should be understood that other correlation metrics may also be used depending on the implementation.

Figure 6:
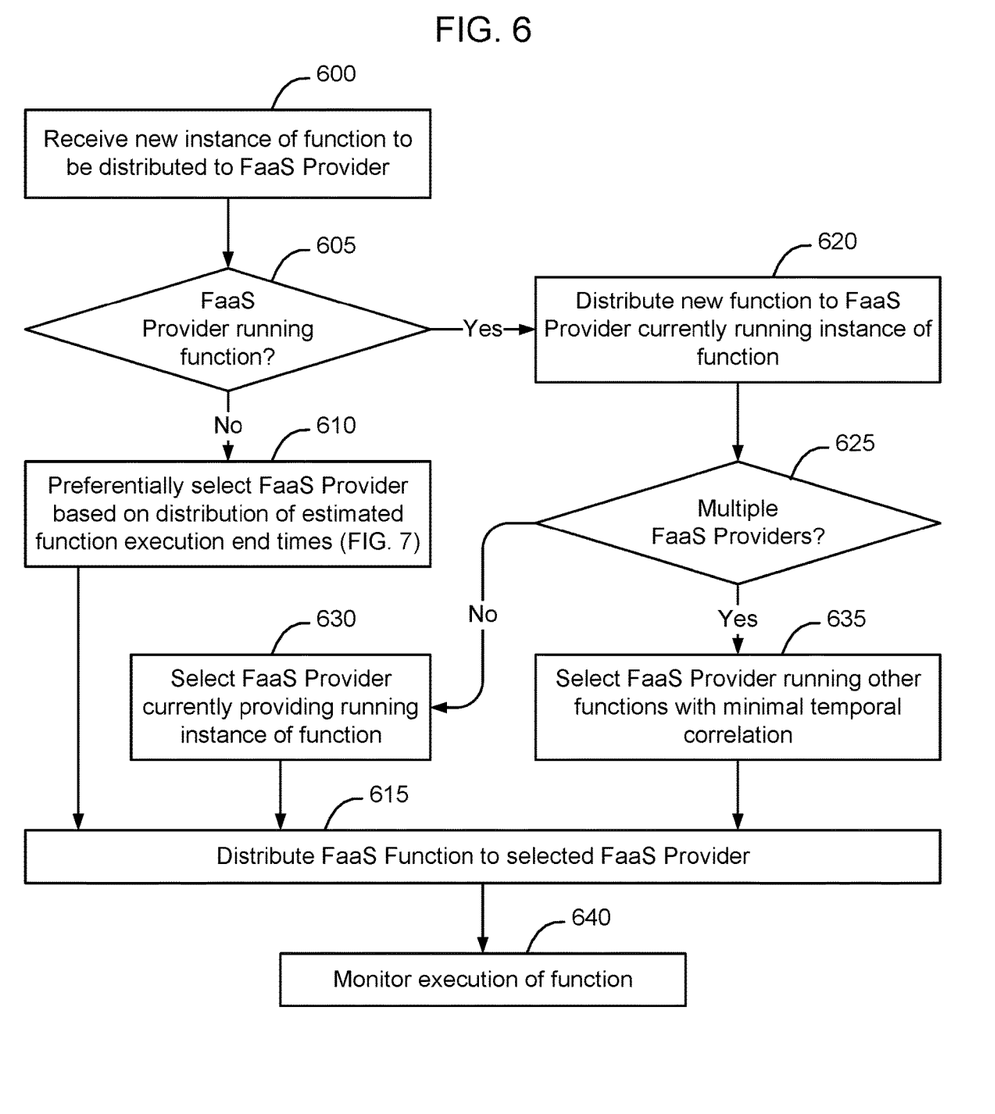
FIG. 6 is a flow chart of an example process implemented by a FaaS distribution system configured to implement FaaS as a Service (FaaSaaS) enabling storage systems to be used as FaaS providers on demand, according to some embodiments.

FIG. 6 is a flow chart of an example process implemented by a FaaS distribution system 130 configured to implement FaaS as a Service (FaaSaaS) enabling storage systems to be used as FaaS providers 110 on demand, according to some embodiments. As shown in FIG. 6, in some embodiments when a FaaS distribution system 130 receives a new instance of a function to be distributed to a FaaS provider 110 (block 600), the FaaS distribution system 130 determines whether any FaaS provider 110 is already executing the type of function associated with the new function. If there is no FaaS provider 110 that is currently executing the type of function that is to be allocated (a determination of NO at block 605), the FaaS distribution system 130 preferentially selects a FaaS provider 110 based on a distribution of estimated function end times, based on the sets of functions that are current executing on the set of available FaaS providers 110 (block 610). After selecting a FaaS provider 110 that has a set of other functions not expected to end at the same time as the current function, the FaaS distribution system 130 distributes the FaaS function to the selected FaaS provider 110 (block 615).

If one or more FaaS providers 110 is found that is already executing an instance of the function (a determination of YES at block 605) the FaaS distribution system 130 will distribute the function to one of the FaaS providers 110 that is currently executing an instance of the function (block 620). In some embodiments, the FaaS distribution system 130 determines if there are multiple FaaS providers 110 that are currently executing an instance of the function (block 625). If only one FaaS provider 110 is currently executing an instance of the function (a determination of NO at block 625), the FaaS distribution system 130 selects the one FaaS provider 110 that is currently executing an instance of the function (block 630). If more than one FaaS provider 110 is currently executing an instance of the function (a determination of YES at block 625), the FaaS distribution system 130 selects one of the FaaS providers 110 that is currently executing an instance of the function by selecting a FaaS provider 110 running other functions that have minimal temporal correlation with the current function (block 635) based on the distribution of estimated function execution end times.

In some embodiments, after a function has been allocated, the FaaS distribution system 130 monitors execution of the function (block 640). For example, the function IO relay service 310 may assist execution of the function by relaying IO requests and responses between the FaaS provider 110 and FaaS consumer 150. Additionally, in some embodiments the entries of the function allocation table 300 are updated to reflect the actual function execution end times 420, whenever execution of a particular function ends.

Figure 7:
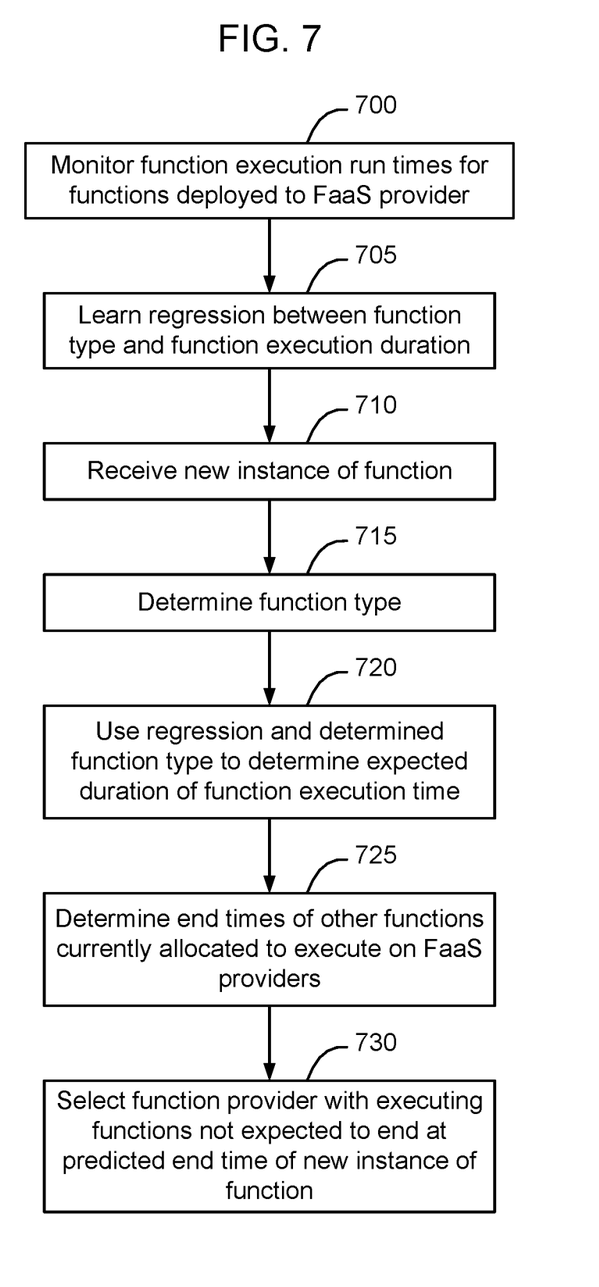
FIG. 7 is a flow chart of an example process implemented by a FaaS distribution system to preferentially select FaaS providers based on end times of existing functions executing on the FaaS provider, according to some embodiments.

FIG. 7 is a flow chart of an example process implemented by a FaaS distribution system 130 to preferentially select FaaS providers 110 based on end times of existing functions executing on the FaaS provider 110, according to some embodiments. As shown in FIG. 7, in some embodiments, the FaaS distribution system 130 monitors function execution run times for functions deployed to FaaS providers 110 (block 700). The FaaS distribution 130 uses the historic function execution run times from these previous allocations to learn a regression between function type and function duration (block 705).

When the FaaS distribution system 130 receives an instance of a function to be allocated (block 710), the FaaS distribution system 130 determines the function type (block 715) and uses the learned regression determined function type to determine an expected duration of function execution time (block 720).

To select a FaaS provider 110, the FaaS distribution system 130 determines the end times of other functions currently allocated to particular FaaS providers 110 (block 725) and selects a FaaS provider 110 with executing functions not expected to end at the predicted end time of the new instance of the function (block 730).

Additional optimizations may be implemented by the FaaS distribution system 130, depending on the implementation. For example, a FaaS distribution system 130 may preferentially cause functions that are calling each other to be allocated to the same FaaS provider 110. Additionally, load balancing can be used by the FaaS distribution system 130 to attempt to allocate FaaS workloads evenly between FaaS providers 110.

As noted in connection with FIG. 3, in some embodiments the FaaS distribution system 130 includes a function image merging subsystem 305. Since FaaS providers 110 have limited excess computational resources, and since the function image is what takes most of the storage space in the container, in some embodiments the function image merging subsystem 305 attempts to merge function images to limit overhead as much as possible.

In some embodiments, a function image is viewed as a set of constructs, including an operating system and a set of additional libraries. The function image merging subsystem 305, in some embodiments, merges function images by comparing the Operating System (OS) parts of the images. In some embodiments, the function image merging system determines, for each two images, if the two images have the same OS part, then the function image merging subsystem 305 will merge the two function images. If the two images do not have the same operating system, the function image merging subsystem 305 will merge the two images if the operating system of image 1 is compatible with the additional libraries of image 2, and the operating system of image 2 is compatible with the additional libraries of image 1.

In some embodiments, the function image merging subsystem also determines whether it is possible to merge the libraries of two functions. In some embodiments, the merged image should include the union of additional libraries (disregarding versions). In addition, for each two images with the same additional library but of a different version, if all other additional libraries are compatible with a certain version (as indicated by the version's documentation), the function image merging subsystem will discard the other versions and use the version that is compatible with both functions. In some embodiments, if the function image merging subsystem determines that several versions are acceptable, the function image merging subsystem will use the version of the library that is most recent. If no merge is possible, the function image merging subsystem will use both version of the library.

It should be noted that the function image merging subsystem is used to merge function images based on the OS and additional library compatibilities is done at run stage, not during the development stage. By merging OS and library components of the functions, it is possible to decrease the function image space overhead in the FaaS provider systems.

In some embodiments, the FaaS distribution system 130 attempts to distribute functions to FaaS providers 110 such that there is minimal temporal correlation between functions at the FaaS provider 110. Since each function image will exist on several FaaS providers 110 to adhere to probabilistic availability SLAs, in some embodiments functions are allocated to several different FaaS providers 110. Consequently, each FaaS provider 110 will have several functions executing at the same time. Since functions residing on the same FaaS provider 110 may compete for computational resources, in some embodiments the FaaS distribution system 130 attempts to allocate functions to FaaS providers 110 to minimize the amount of times that the two functions will run together.

In some embodiments, the FaaS distribution system 130 achieves this by looking at the time series of the amount of the function's runs and placing functions with low Pearson Cross Correlation at the same FaaS provider 110. Another option is to use the time series to predict the future function runs and place them based on the prediction's Pearson Cross Correlation. By distributing function images among FaaS providers 110 with minimal run time correlation, it is possible to reduce the functions competition for computational resources of the FaaS provider 110.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for enabling computer resources of storage systems to be more fully utilized, the computer program including a set of instructions which, when executed by a computer, cause the computer to perform a method comprising the steps of:
  receiving, by a Function as a Service (FaaS) distribution system, Function as a Service (FaaS) workload requests associated with FaaS workloads from FaaS function consumers; and
  orchestrating, by the FaaS distribution system, automatic distribution of the FaaS workloads between a dynamically changing set of autonomous storage systems configured to implement FaaS providers by processing the FaaS workloads, each FaaS workload comprising a respective new FaaS function to be distributed to a respective FaaS provider for execution by the selected FaaS provider, wherein orchestrating distribution of the FaaS workloads comprises, for each new FaaS function:
  receiving the new FaaS function from a respective FaaS function consumer;
  determining an expected duration of execution of the new FaaS function and using the expected duration of execution of the new FaaS function to determine an expected execution end time of the new FaaS function;
  determining a set of available FaaS providers from the dynamically changing set of autonomous storage systems, the set of available FaaS providers being determined as including a subset of the autonomous storage systems that are not being used at full capacity to process primary storage system workloads, at least some of the available FaaS providers having a respective subset of other FaaS functions executing thereon;
  determining expected execution end times of the respective subsets of other FaaS functions executing on each of the respective available FaaS providers;
  selecting one of the available FaaS providers which has a respective subset of other FaaS functions with expected execution end times that do not coincide with the expected execution end time of the new FaaS function; and
  automatically allocating the new FaaS function to the selected available FaaS provider for execution by the selected FaaS provider.

2. The non-transitory tangible computer readable storage medium of claim 1, wherein the step of determining an expected duration of execution of the new FaaS function comprises:
  monitoring FaaS function execution times; and
  using the monitored FaaS function execution times to train a temporal difference learning process to learn a regression between FaaS function type and FaaS function execution duration.

3. The non-transitory tangible computer readable storage medium of claim 1, wherein the step of selecting one of the FaaS providers further comprises determining a function type of the new FaaS function;
  determining function types of the respective subset of other FaaS functions for a given FaaS provider; and
  selecting the given FaaS provider where at least one of the function types of the respective subset of other FaaS functions is the same as the function type of the new FaaS function.

4. The non-transitory tangible computer readable storage medium of claim 1, wherein the step of selecting one of the FaaS providers further comprises determining a function type of the new FaaS function;
  determining temporal execution characteristics of the function type of the new FaaS function;
  determining function types of the respective subset of other FaaS functions for a given FaaS provider;
  determining temporal execution characteristics of the function types of the respective subset of other FaaS functions for the given FaaS provider; and
  selecting the given FaaS provider where the temporal execution characteristics of the function type of the new FaaS function have a lowest Pearson Cross Correlation with temporal execution characteristics of the function types of the respective subset of other FaaS functions for the given FaaS provider.

5. The non-transitory tangible computer readable storage medium of claim 1, further comprising creating an entry in a FaaS function allocation data structure identifying the selected FaaS provider, a type of the new FaaS function that was allocated to the selected FaaS provider, and an indication of an expected duration of execution of the new FaaS function.

6. The non-transitory tangible computer readable storage medium of claim 5, further comprising merging, by the FaaS distribution system, an image of the allocated new FaaS function with an image of one of the respective subset of other FaaS functions executing on the selected FaaS provider, and distributing the merged image of the FaaS function to be executed on the selected FaaS provider.

7. The non-transitory tangible computer readable storage medium of claim 5, further comprising monitoring the allocated FaaS function to determine an actual execution end time of the allocated FaaS function.

8. The non-transitory tangible computer readable storage medium of claim 7, further comprising updating the entry in the FaaS function allocation data structure with the actual execution end time.

9. The non-transitory tangible computer readable storage medium of claim 1, further comprising:

receiving, by the FaaS distribution system, an IO request from the new FaaS function for data stored remote from the FaaS provider;

forwarding, by the FaaS distribution system, the IO request to a data provider storing the requested data;

receiving, by the FaaS distribution system, an IO response containing the requested data from the data provider; and forwarding, by the FaaS distribution system, the IO response containing the requested data to the new FaaS function on the selected FaaS provider.

10. The non-transitory tangible computer readable storage medium of claim 9, wherein the data provider is the FaaS function consumer.

11. A method of enabling computer resources of storage systems to be more fully utilized, comprising:
receiving, by a Function as a Service (FaaS) distribution system, Function as a Service (FaaS) workload requests associated with FaaS workloads from FaaS function consumers; and
orchestrating, by the FaaS distribution system, automatic distribution of the FaaS workloads between a dynamically changing set of autonomous storage systems configured to implement FaaS providers by processing the FaaS workloads, each FaaS workload comprising a respective new FaaS function to be distributed to a respective FaaS provider for execution by the selected FaaS provider, wherein orchestrating distribution of the FaaS workloads comprises, for each new FaaS function:
receiving the new FaaS function from a respective FaaS function consumer;
determining an expected duration of execution of the new FaaS function and using the expected duration of execution of the new FaaS function to determine an expected execution end time of the new FaaS function;
determining a set of available FaaS providers from the dynamically changing set of autonomous storage systems, the set of available FaaS providers being determined as including a subset of the autonomous storage systems that are not being used at full capacity to process primary storage system workloads, at least some of the available FaaS providers having a respective subset of other FaaS functions executing thereon;
determining expected execution end times of the respective subsets of other FaaS functions executing on each of the respective available FaaS providers;
selecting one of the available FaaS providers which has a respective subset of other FaaS functions with expected execution end times that do not coincide with the expected execution end time of the new FaaS function; and
automatically allocating the new FaaS function to the selected available FaaS provider for execution by the selected FaaS provider.

12. The method of claim 11, wherein the step of determining an expected duration of execution of the new FaaS function comprises:
monitoring FaaS function execution times;
using the monitored FaaS function execution times to train a temporal difference learning process to learn a regression between FaaS function type and FaaS function execution duration.

13. The method of claim 11, wherein the step of selecting one of the FaaS providers further comprises determining a function type of the new FaaS function;
determining function types of the respective subset of other FaaS functions for a given FaaS provider; and
selecting the given FaaS provider where at least one of the function types of the respective subset of other FaaS functions is the same as the function type of the new FaaS function.

14. The method of claim 11, wherein the step of selecting one of the FaaS providers further comprises determining a function type of the new FaaS function;
determining temporal execution characteristics of the function type of the new FaaS function;
determining function types of the respective subset of other FaaS functions for a given FaaS provider;
determining temporal execution characteristics of the function types of the respective subset of other FaaS functions for the given FaaS provider; and
selecting the given FaaS provider where the temporal execution characteristics of the function type of the new FaaS function have a lowest Pearson Cross Correlation with temporal execution characteristics of the function types of the respective subset of other FaaS functions for the given FaaS provider.

15. The method of claim 11, further comprising creating an entry in a FaaS function allocation data structure identifying the selected FaaS provider, a type of the new FaaS function that was allocated to the selected FaaS provider, and an indication of an expected duration of execution of the new FaaS function.

16. The method of claim 15, further comprising merging, by the FaaS distribution system, an image of the allocated new FaaS function with an image of one of the respective subset of other FaaS functions executing on the selected FaaS provider, and distributing the merged image of the FaaS function to be executed on the selected FaaS provider.

17. The method of claim 15, further comprising monitoring the allocated FaaS function to determine an actual execution end time of the allocated FaaS function.

18. The method of claim 17, further comprising updating the entry in the FaaS function allocation data structure with the actual execution end time.

19. The method of claim 11, further comprising:
receiving, by the FaaS distribution system, an IO request from the new FaaS function for data stored remote from the FaaS provider;
forwarding, by the FaaS distribution system, the IO request to a data provider storing the requested data;
receiving, by the FaaS distribution system, an IO response containing the requested data from the data provider; and
forwarding, by the FaaS distribution system, the IO response containing the requested data to the new FaaS function on the selected FaaS provider.

20. The method of claim 19, wherein the data provider is the FaaS function consumer.

* * * * *